ns Patent [15] 3,644,015
[45] Feb. 22, 1972

[54] ACOUSTO-OPTIC BAND REJECT LIGHT FILTER AND APPARATUS USING SAME

[72] Inventor: John R. Hearn, Los Altos Hills, Calif.
[73] Assignee: Hewlett-Packard Company, Palo Alto, Calif.
[22] Filed: June 18, 1970
[21] Appl. No.: 47,267

[52] U.S. Cl. .............................. 350/149, 350/150, 350/161
[51] Int. Cl. ............................................................ G02f 1/24
[58] Field of Search .................. 350/147, 149, 150, 160, 161; 356/74–101; 250/199

[56] References Cited

UNITED STATES PATENTS

| 3,439,974 | 4/1969 | Henry et al. | 350/149 |
| 3,354,465 | 11/1967 | Merritt et al. | 350/150 X |
| 3,563,656 | 2/1971 | Helms | 356/100 X |
| 3,562,414 | 2/1971 | Blum | 350/161 X |
| 3,432,223 | 3/1969 | Uchida | 350/150 |
| 2,339,053 | 1/1944 | Coleman | 356/96 X |
| 3,485,559 | 12/1969 | De Maria | 350/161 X |
| 3,517,332 | 6/1970 | De Maria | 350/161 X |

OTHER PUBLICATIONS

Harris et al., " Acousto– Optic Tunable Filter" J.O.S.A. Vol. 59, No. 6 (June 1969) pp. 744– 747.
Harris et al., " Electronically Tunable Acousto– Optic Filter" Applied Physics Letters Vol. 15; No. 10 (Nov. 15, 1969) pp. 325– 326.

Primary Examiner—David Schonberg
Assistant Examiner—Paul R. Miller
Attorney—A. C. Smith

[57] ABSTRACT

An acousto-optic band reject light filter is disclosed. The light filter includes an optically anisotropic medium, such as a birefringent crystal, in which an acoustic wave is excited at a certain selected radiofrequency corresponding to a selected optical frequency to be rejected. The crystal is disposed to receive an incident light beam containing the selected optical frequency to be rejected. The light beam is collinearly diffracted on the acoustic wave within the optically anisotropic medium to diffract light of a first polarization and of the selected optical frequency related to the acoustic frequency into light of a second polarization. The diffracted light beam is then passed through a polarization analyzer to reject from the diffracted light beam light of the second polarization while retaining in the diffracted light beam light of the first polarization. The selectable frequency in the light beam which is to be rejected can be tuned over a wide band by tuning the frequency of the acoustic wave within the crystal.

12 Claims, 2 Drawing Figures

PATENTED FEB 22 1972

3,644,015

INVENTOR.
JOHN R. HEARN

3,644,015

ACOUSTO-OPTIC BAND REJECT LIGHT FILTER AND APPARATUS USING SAME

RELATED CASES

The provision of a light intensity control loop is disclosed and claimed in copending U.S. application Ser. No. 47,358 filed on June 18, 1970, and assigned to the same assignee as the present invention. Also, sweeping the frequency of the output light beam is disclosed and claimed in the aforecited copending application. Control of the output beam intensity by control of the acoustic power density is disclosed and claimed in copending U.S. application Ser. No. 46,911 filed June 17, 1970, assigned to the same assignee as the present invention.

DESCRIPTION OF THE PRIOR ART

Heretofore, electronically tunable acousto-optic band-pass filters have been constructed wherein light of a first polarization was collinearly diffracted on an acoustic wave in an optically anisotropic medium, such as birefringent crystal, to shift the polarization of the light at a selected band-pass optical frequency from a first polarization to a second polarization. The diffracted light was then polarization analyzed to pass the light of the second polarization and to exclude or reject the light of the first polarization. The bandpass characteristic of the acousto-optic filter was electrically tunable by varying the frequency of the acoustic wave within the birefringent crystal. Such an acousto-optic filter is disclosed in an article titled "Acousto-Optic Tunable Filter" appearing in the Journal of the Optical Society of American, Volume 59, No. 6 of June 1969, pages 744–747, and in an article titled "Electronically Tunable Acousto-Optic Filter" appearing in the Applied Physics Letter, Volume 15, No. 10, of 15 Nov. 1969, pages 325 and 326.

While the provision of a band-pass filter is useful in many applications, the provision of a band reject filter also has many applications. Therefore, it is desired to provide a tunable band reject light filter and apparatus using same.

SUMMARY OF THE PRESENT INVENTION

The principal object of the present invention is the provision of an acousto-optic band reject light filter and apparatus using same.

One feature of the present invention is the provision of an acousto-optic band reject light filter.

Another feature of the present invention is the same as the preceding wherein light of a first polarization and frequency related to an acoustic wave is diffracted from a collinear acoustic wave in an optically anisotropic medium to shift the polarization of the light at an optical frequency related to the frequency of the acoustic wave, to a second polarization and wherein the diffracted light beam is polarization analyzed to reject from the light beam light of the second polarization while retaining in the diffracted light beam light of the first polarization.

Another feature of the present invention is the same as any one or more of the preceding features including the provision of means for changing the frequency of the acoustic wave to change the optical frequency of the light rejected from the diffracted light beam.

Another feature of the present invention is the same as any one or more of the preceding features including the provision of means for detecting the intensity of the light of the selected optical frequency which is rejected and controlling the power density of the acoustic wave in the anisotropic medium to obtain a substantially constant rejected light intensity.

Another feature of the present invention is the same as any one or more of the preceding features including the provision of passing the diffracted and polarization analyzed light beam of the first polarization into an optical device to be tested and spectrum analyzing such light obtained from the optical device as modified by passage through the device to obtain information concerning the nonlinear optical transfer characteristics of the device under test.

Other features and advantages of the present invention will become apparent upon a perusal of the following specification taken in connection with the accompanying drawings wherein:

DESCRIPTION OF THE PREFERRED EMBODIMENTS

Figure 1:
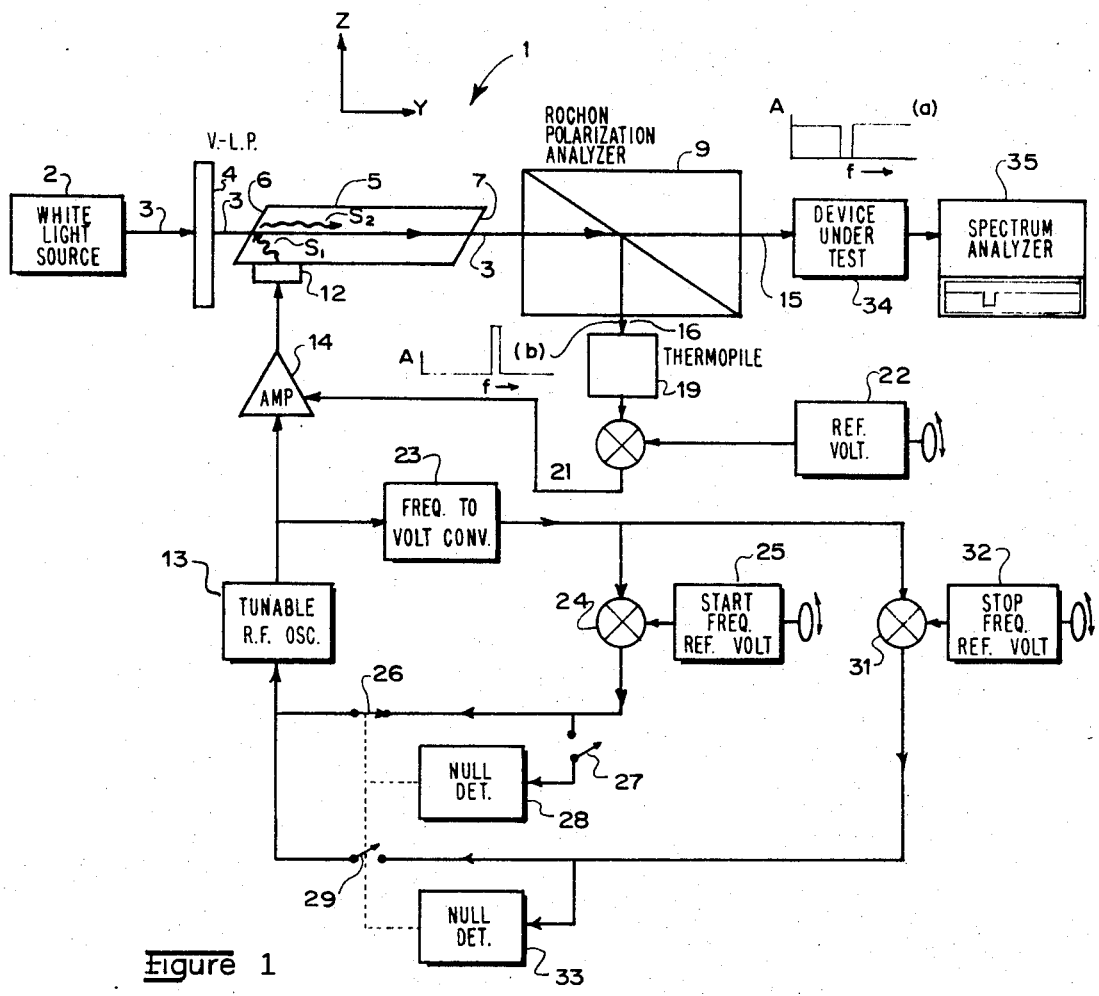
FIG. 1 is a schematic line diagram, partly in block diagram form, depicting an acousto-optic apparatus incorporating features of the present invention.

Referring now to FIG. 1, there is shown an acousto-optic system 1 incorporating features of the present invention. The acousto-optic system 1 is similar in many respects to that disclosed in the aforecited Journal of the Optical Society of America with the exception that means have been provided for analyzing the polarization of the output light beam to reject light of a polarization orthogonal to the polarization of the light incident of the acousto-optic device. More specifically, the acousto-optic system 1 includes a light source 2 which projects a beam of light 3 through a vertical linear polarizer 4 into an optically anisotropic medium 5, such as a birefringent crystal of $LiNbO_3$, $PbMoO_4$, $CaMoO_4$ or quartz. The beam of light 3 is directed against the input face 6 at such an angle that the light beam is directed through the crystal in a line with the Y axis between the end faces 6 and 7.

The light source 2 may be of any type. For example, it may be a coherent light source, such as that obtained by a laser, or it may be a broadband light source having a uniform spectral power density, such as that produced by a white light source. The input vertical polarizer 4 serves to pass only that light from the source 2 which is polarized in the vertical direction, i.e., the Z direction, to provide a polarized input light beam 3. The input light beam enters the input face 6 of the crystal 5 in which it propagates generally along a predetermined axis labeled Y and passes out the opposite face 7 as an output beam 3. Output beam 3 is then passed through a second linear polarizer or polarization analyzer 9, such as a Rochon prism, oriented such that its axis of transmission is aligned with the polarization of the input beam 3, i.e., the axis of transmission has the same polarization as the input polarizer 4.

An acoustic transducer 12 is mounted in intimate contact with the crystal 5 and is connected to a suitable signal generator or source 13, such as a radiofrequency-tunable oscillator, via the intermediary of a power amplifier 14. The acoustic transducer 12 is driven by the radiofrequency power derived from the tunable RF oscillator 13 and power amplifier 14 to excite a shear acoustic wave $S_1$, which is directed against the inside surface of the input face 6 to internally reflect and convert shear wave $S_1$ into a second shear wave $S_2$ which propagates down the Y axis of the crystal collinearly with the incident light beam 3.

For particular combination of light wave and acoustic wave frequencies, there is found to be a strong interaction between the light and the acoustic wave in which the acoustic wave diffracts the light wave from the polarization orientation of the input beam 3 into the orthogonal polarization. This yields a narrow band of light waves of orthogonal polarization which are separated by rejection from the input light waves by the polarization analyzer 9. This narrow band of light waves of the cross polarization has a frequency which is a function of the applied acoustic frequency and can, therefore, be varied in frequency by varying the frequency of excitation supplied to the acoustic transducer 12 from the tunable RF oscillator 13.

This aforedescribed collinear diffraction occurs as a cumulative effect for a narrow band of light frequencies, and it is noncumulative by incremental self-cancellation for other frequencies. The cumulative diffraction effect occurs when the momentum vectors $\bar{k}$ of the incident light and acoustic wave satisfy the relation that their sum equals that of the output light beam. This condition is called "phase matching" and occurs when the diffraction generated polarization travels at the same velocity as the free electromagnetic wave. A narrow band of frequencies satisfying this relation and diffracted into the orthogonal polarization is then rejected by the output polarization analyzer 9 while the light of the initial polarization is passed by the output analyzer 9 to produce an output light beam 15 having a band reject transfer characteristic also known as a notch filter characteristic, as shown by spectrum (a). The light which has been diffracted from the first polarization to the second or orthogonal polarization is rejected by the polarization analyzer 9 and reflected as a second output beam 16 having the typical bandpass characteristics as shown by spectrum (b).

Diffraction into the orthogonal polarization occurs via the $P_{41}$ photoelastic constant, for lithium niobate, and is only cumulative if $|k_0| - |k_e| = |k_a|$ where the $_{o, e}$ and $_a$ denote the ordinary and extraordinary light waves, and the acoustic wave, respectively. This will be the case if the light and acoustic frequencies $f_o$ and $f_a$ are related by:

$$f_o = c\, f_a / V\, \Delta n \qquad \text{Eq. (1)}$$

where $c/V$ is the ratio of the light velocity in vacuum to the acoustic velocity in the medium, and $\Delta n$ is the birefringence of the crystal.

In a typical case of lithium niobate, the acousto-optic device 1 is tunable from 7,000 to 5,500 A. by changing the acoustic drive frequency from 750 to 1,050 mHz. A band reject of less than 2 A. is obtained for output beam 15 when a crystal 5 cm. long is employed.

Figure 2:
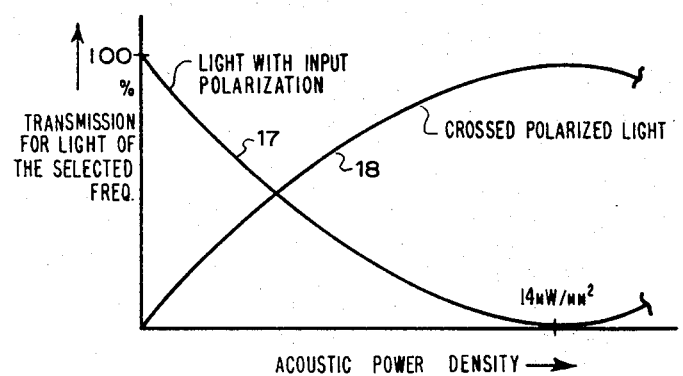
FIG. 2 is a plot of light transmission, in percent, versus acoustic power density in the optically anisotropic medium for output light of two orthogonal polarizations.

The percent light transmission characteristics versus the acoustic power density for the acousto-optic device 1 is shown in FIG. 2. More specifically, the percent transmission for light of the selected band reject frequency for output beam 15 is shown by curve 17, whereas the percent transmission at the band reject frequency in the cross-polarized light beam 16 is shown by curve 18 of FIG. 2. For a lithium niobate crystal 5 centimeters long, an acoustic power density of 14 milliwatts per square millimeter results in nearly 100 percent of the light in the input beam 3 at the band reject frequency being shifted to the crossed polarization. With lesser acoustic power densities, a smaller percentage of the light at the selected band reject frequency is shifted from the input polarization to the cross polarization.

The percentage of light shifted from the first polarization to the second polarization at the band reject frequency is controlled to a predetermined percentage by provision of a control loop including a thermopile detector 19 disposed to monitor the intensity of the cross-polarized output beam 16. The output of the detector 19 is a voltage proportional to the percent transmission of the cross-polarized light beam 16. This reference voltage is compared in an error detector 21 with a reference voltage derived from a reference voltage source 22, such reference voltage source being controlled or set at a desired percent transmission at the band reject frequency. The output of the error detector 21 is fed to a gain control input of the power amplifier 14 for controlling the acoustic power density within the crystal 5 to produce the desired selected reference percentage transmission at the band reject frequency.

The acoustic power density required in the crystal 5 to produce a certain percentage transmission for light at the selected band reject frequency is a function of the frequency of the acoustic wave. More particularly, as the acoustic frequency is changed, the acoustic power should be varied inversely as the square of the acoustic frequency, if constant transmittance at the band reject optical frequency is to be maintained.

For certain applications it is desired that the band reject frequency be swept in frequency over a relatively wide range of optical frequencies. In such a case, the output optical frequency is swept by sweeping the frequency of the tunable RF oscillator 13. For this purpose, a frequency-to-voltage converter 23 is connected to sample a portion of the output of RF oscillator 13 and for converting the frequency of the oscillator to DC voltage proportional to that frequency. The DC output of the frequency-to-voltage converter 23 is fed to one input of an error detector 24 for comparison with a DC voltage derived from a "start frequency" reference voltage supply 25 which has a control accessible to the operator which is calibrated in terms of output optical frequency.

The operator sets the reference frequency voltage to a selectable frequency corresponding to the start of a sweep of the desired optical spectrum to be swept. The output of the error detector 24 is fed via a switch 26 to the input of the tunable RF oscillator for causing the oscillator to be tuned in accordance with the error signal. When the output of the error detector reaches a null condition, i.e., the error signal drops to zero amplitude, the frequency of the RF oscillator is at that frequency corresponding to the selected band reject optical frequency.

If it is desired to sweep the band reject frequency across a selected optical band, switch 27 is closed connecting a null detector 28 to the output of error detector 24. The null detector senses the null output condition of error detector 24 and closes a suitable relay or the like mechanically interconnected to switch 26 for opening switch 26 and closing a second switch 29 which is connected in circuit with the output of a second error detector 31 which compares the output of the frequency-to-voltage converter 23 with a reference voltage derived from a "stop frequency" reference voltage supply 32 having a control accessible to the operator and calibrated in terms of the optical frequency of the band reject.

The output of the error detector 31 is fed via switch 29 to the tunable RF oscillator for causing the oscillator to sweep at a rate which may be controlled by a separate control within the RF oscillator, not shown. When the frequency of the RF oscillator is at the "stop frequency" as determined by the "stop frequency" reference voltage, the error signal in the output of error detector 31 will have dropped to zero amplitude and a second null detector 33, connected to the output of error detector 31 senses the null and opens switch 29, thereby closing switch 26 and causing the sweep to recycle.

The notch filter response of output beam 15 is useful for testing optical devices for nonlinear optical transmission characteristics and for testing multichannel optical communication devices for cross talk. In such a system, as shown in FIG. 1, an optical device 34 under test is disposed to receive the output light beam 15 in an optical channel within the device 34 under test. The band reject frequency is set via reference voltage supply 25 to the optical frequency of the channel under test. The light passing through the optical channel under test and as modified by passage through that channel is fed to the input of a spectrum analyzer 35 wherein the optical frequencies within the reject band are analyzed to determine the extent to which there is coupling of light from adjacent frequencies into the band-pass frequency of the channel under test. The extent to which light is coupled from adjacent bands into the passband is a measure of the optical nonlinearity of the device 34 under test. The band reject frequency may be swept across the entire bandwidth of the white light source 2 and the corresponding modification of the output light beam 15 by the device 34 under test is spectrum analyzed by spectrum analyzer 35 to determine the optical nonlinearities of the device 34, as a function of optical frequency.

As used herein "light" is defined as electromagnetic radiation. Such light need not be confined to the visible spectrum. In some birefringent crystals, the phase velocity and group velocity vectors for the acoustic wave are divergent and may diverge by as much as 20°, as is obtained in the case of quartz. In such a case, the light beam path may be collinear with either the phase or group velocity of the acoustic wave to obtain the "phase-matched" collinear diffraction described herein. Therefore, as used herein "collinear" means that the light beam path is collinear with either the phase or group velocity of the acoustic wave.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:

1. In a method for rejecting light of a selected optical frequency from a light beam the steps of, exciting an acoustic wave in an optically anisotropic medium at a selected radiofrequency related to the optical frequency of the light to be rejected, substantially collinearly diffracting the light beam on the acoustic wave within the optically anisotropic medium to diffract light of a first polarization and of the selected optical frequency related to the acoustic frequency into light of a second polarization, analyzing the diffracted light beam to reject from the diffracted light beam light of the second polarization while retaining in the diffracted light beam light of the first polarization, detecting the intensity of the light of the optical frequency which is rejected, and controlling the power density of the acoustic wave in the optically anisotropic medium in response to the intensity of the light of the optical frequency which is rejected.

2. The method of claim 1 including the step of, passing the diffracted and polarization analyzed light beam of the first polarization into an optical device to be tested, and spectrum analyzing such light obtained from the optical device as modified by passage through the device to provide an indication of the optical transfer characteristics of the device under test.

3. The method of claim 1 including the step of introducing a beam of white light as the beam of incident light.

4. In an acousto-optic apparatus, optically anisotropic medium means, means for exciting an acoustic wave in said optically anisotropic medium means at a selected radio frequency related to the optical frequency of light to be rejected, said optically anisotropic medium means being disposed to receive an incident light beam for substantially collinearly diffracting the light beam on the acoustic wave within said optically anisotropic medium means to diffract light of a first polarization and of the optical frequency to be rejected into light of a second polarization, means for polarization analyzing the diffracted light beam to reject, from the diffracted light beam, light of the second polarization while retaining in the diffracted light beam light of the first polarization, means for detecting the intensity of the light of the optical frequency which is rejected, and circuit means for controlling the power density of the acoustic wave in the anisotropic medium means in response to the intensity of the detected light of the optical frequency which is rejected.

5. The apparatus rejected, claim 4 wherein said circuit means includes means for detecting the intensity of the light of the optical frequency which is rejected and for producing an output representative of the detected intensity, means for producing a reference output corresponding to a desired intensity of the light which is rejected, means for comparing the detected rejected light intensity output with the reference output to derive an error output, and means responsive to the error output for controlling the power density of the acoustic wave in the anisotropic medium means to obtain a substantially constant rejected light intensity as a function of frequency of the rejected light.

6. The apparatus of claim 4 disposed to apply to an optical device means to be tested the diffracted and polarization analyzed light beam of the first polarization, and comprising spectrum-analyzing means disposed to receive light obtained from an optical device means under test as modified by passage through the device means to provide an indication of the nonlinear optical transfer characteristics of the device means under test.

7. The apparatus of claim 4 including means for sweeping the frequency of the acoustic wave within said optically anisotropic medium means to obtain a sweep of the optical frequency of the light rejected from the diffracted light beam, and said circuit means includes circuitry for altering the power density of the acoustic wave in the anisotropic medium means to maintain substantially constant rejected light intensity as a function of the optical frequency of the rejected light.

8. The apparatus of claim 4 including source means for directing a beam of white light into said optically anisotropic medium means as said incident light beam.

9. In an acousto-optic apparatus, an optically anisotropic medium means disposed to receive a beam of light for propagating the light beam as a particular wave having a first polarization orientation in a birefringent system, said medium means being further capable of propagating a light beam polarized in the second polarization orientation different from the first polarization orientation as another wave of said birefringent system, means coupled to said medium means for developing an acoustic wave of a predetermined frequency in said anisotropic medium means, the frequency of said acoustic wave being selected to define a phase-matched relationship such that the vector sum of the momentum vectors of the incident light beam and the acoustic wave are equal to that of an output light beam oriented at said second polarization, whereby an incident light beam satisfying that condition for a given acoustic wave frequency is diffracted into that second polarization orientation, and means for polarization analyzing the diffracted light beam to reject light of the second polarization while retaining in the diffracted light beam light of the first polarization, whereby an output band reject optical filter response is obtained, means for detecting the intensity of the light of the optical frequency which is rejected, and circuit means for controlling the power density of the acoustic wave in the anisotropic medium means in response to the intensity of the detected light of the optical frequency which is rejected.

10. The apparatus of claim 9 including means for sweeping the frequency of the acoustic wave within said optically anisotropic medium means to obtain a sweep of the optical frequency of the light rejected from the diffracted light beam, and said circuit means includes circuitry for altering the power density of the acoustic wave in the anisotropic medium means to maintain substantially constant rejected light intensity as a function of the optical frequency of the rejected light.

11. Acousto-optic apparatus as in claim 9 wherein said anisotropic medium means is capable of propagating a light beam having said first polarization as a particular wave in the birefringent system and of diffracting and propagating a light beam of orthogonal polarization to said first beam as another wave of said birefringent system in response to acoustic waves propagating within said anisotropic medium means in a direction substantially collinear with the direction of propagation of the light beams within said medium means, and the frequency of said acoustic waves is selected to define a phase-matched relationship such that the vector sum of the momentum vectors of the incident light beam and the acoustic waves are equal to that of an output light beam orthogonally oriented to said input light beam, whereby the incident light beam satisfying that condition for a given acoustic wave frequency is diffracted into said orthogonal polarization.

12. The apparatus of claim 11 including source means for directing a beam of white light into said optically anisotropic medium means as the incident light beam.

* * * * *

UNITED STATES PATENT OFFICE
CERTIFICATE OF CORRECTION

Patent No. 3,644,015  Dated February 22, 1972

Inventor(s) John R. Hearn

It is certified that error appears in the above-identified patent and that said Letters Patent are hereby corrected as shown below:

Column 1, line 31, "American" should read -- America --; line 34, "Physics Letter" should read -- Physics Letters --;

Column 5, line 51, "apparatus rejected," should read -- apparatus of --.

Signed and sealed this 13th day of June 1972.

(SEAL)
Attest:

EDWARD M. FLETCHER, JR.
Attesting Officer

ROBERT GOTTSCHALK
Commissioner of Patents

FORM PO-1050 (10-69)